W. E. SHARP.
LOCK NUT AND METHOD OF CONSTRUCTING THE SAME.
APPLICATION FILED OCT. 22, 1917.
1,298,583.
Patented Mar. 25, 1919.
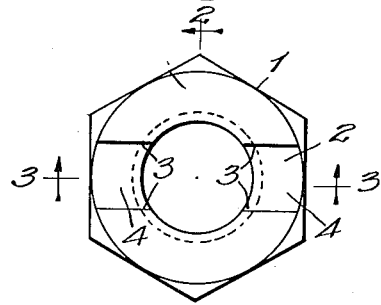
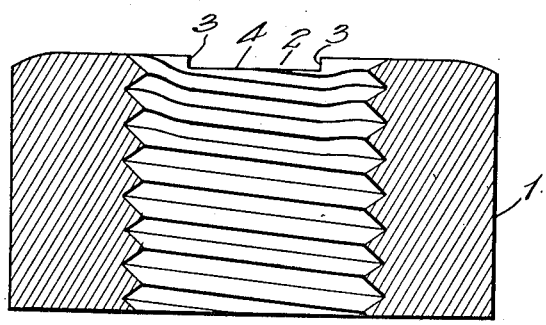
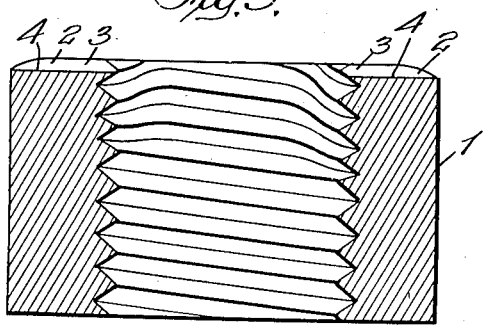

UNITED STATES PATENT OFFICE.

WILLIAM E. SHARP, OF CHICAGO, ILLINOIS, ASSIGNOR TO GRIP NUT COMPANY, OF CHICAGO, ILLINOIS, A CORPORATION OF ILLINOIS.

LOCK-NUT AND METHOD OF CONSTRUCTING THE SAME.

1,298,583.     Specification of Letters Patent.     Patented Mar. 25, 1919.

Application filed October 22, 1917. Serial No. 197,855.

*To all whom it may concern:*

Be it known that I, WILLIAM E. SHARP, a citizen of the United States, residing at Chicago, in the county of Cook and State of Illinois, have invented certain new and useful Improvements in Lock-Nuts and Methods of Constructing the Same, of which the following is a description.

My invention belongs to that general class of devices adapted to so engage the coöperating bolt as not to be accidentally disengaged therefrom by the vibration or jarring of the parts. It has for its object the construction of such a device in a simple manner which will be positive in its action and durable in its effect.

To this end my invention consists in the novel construction form of lock nuts and the process of forming the same herein shown and described and more particularly pointed out in the claims.

In the drawings, wherein like reference characters indicate like or corresponding parts, Figure 1 is a plan view of a bolt nut embodying my improvement;

Fig. 2 is a sectional view of the same substantially on line 2—2 of Fig. 1, and

Fig. 3 is a similar section substantially on line 3—3 of Fig. 1.

In the drawings, 1 represents a bolt nut of any of the ordinary forms in outline, as shown being hexagonal. The nut blank is formed and threaded in the usual manner, in this respect corresponding to the usual form and construction of nuts of this character. After the nut is thus formed it is placed in a press and a suitable tool, preferably flat faced, is forced downward upon one face of the nut to form a depression 2. This depression is centrally disposed, thus being separated by the bolt hole, and to secure the results sought should not be greater in width than the diameter of the bolt hole. In the preferred construction as shown, the width of the depression is from sixty to eighty per cent. of the diameter of the bolt hole. This operation, as clearly shown in Figs. 2 and 3, depresses the threads near the face of the nut beneath the depression 2 on each side of the bolt hole, thus changing the normal construction of the threads at those points, causing the bend at the ends of the depressed section of the threads to assume a rather abrupt form as shown at 3. Owing to the inclination of the threads in the nut the bottom 4 of the depression, which is preferably substantially flat as stated, extends at an angle to the inclination of the thread. This causes a slightly greater depression in relation to the thread itself on one side than on the other, as shown in exaggeration in Figs. 2 and 3. The force employed in bringing about this construction is preferably such that the effect disappears two or three threads down from the bottom of the depression. By this construction it will be seen that the nut may be readily threaded upon the bolt from one face in the usual manner, but when the bolt reaches the abnormal threads of the nut the threads of the bolt on each side of the depressed section will be supported from the under side so to speak, while the depressed section of the threads in the nut will bear forcibly down upon the upper side of the thread of the bolt; thus the threads of the bolt that come within the effect of the abnormal part of the nut will be firmly embraced from opposite sides thereof as described, serving to firmly engage and prevent its accidental disengagement therefrom.

As shown in the drawings, the construction is greatly exaggerated in order to make clear the function of the device in the manner described. In practice the depression is but slight, being less than the distance between two threads of the bolt, and in fact but a fraction thereof.

By reason of the peculiar construction described and the width of the depressed portion, when properly constructed, it is found that the nut may be mounted and removed from the bolt a number of times without destroying its efficiency. In this form of lock nut the width of the depressed part is such as to give a sufficient bearing upon the thread of the bolt to prevent the abnormal threads on the nut being readily pressed back into its original position.

As I have previously stated, the pressure upon the nut is sufficient to extend the effect described upon the threads only a few threads from the upper surface of the nut. This, however, may be modified somewhat. Where an excess pressure is employed, however, the deflection of the thread is likely to become too great to secure a perfect action, and on the other hand, action being equal to reaction, there is a tendency to deflect the threads near the lower surface of the nut at the time pressure is brought to bear upon the upper surface thereof. Owing to the difference in area when pressure is brought upon the two surfaces of the nut however, the lower surface is not affected to a sufficient extent to interfere with its operation as described.

In practical use the nut has proven very effective for the purposes described.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:—

1. A lock nut comprising a threaded bolt nut having a centrally disposed depression across one face thereof not greater in width than the diameter of the bolt hole, a section of one or more of the threads near that face of the nut beneath the depression on each side of the bolt hole being depressed beyond their normal line of direction, said effect growing less toward the center of the nut.

2. A lock nut comprising a threaded bolt nut having a centrally disposed substantially flat depression across one face thereof not greater than the width of the diameter of the bolt hole, a section of one or more of the threads near the face of the nut beneath the depression on each side of the bolt hole being depressed beyond the normal lines thereof, said effect disappearing toward the center of the nut.

3. A lock nut comprising a threaded bolt nut having a centrally disposed substantially flat depression across one face thereof, said depression being markedly less in width than the diameter of the bolt hole, a section of one or more of the threads near that face of the nut beneath the depression on each side of the bolt hole being depressed beyond their normal line of direction, said effect disappearing toward the center of the nut.

4. The process of forming a lock nut consisting in taking a threaded bolt nut of the usual form and forming a centrally disposed depression across one face thereof less in width than the diameter of the bolt hole, to cause a section of one or more of the threads near the face of the nut beneath the depression on each side of the bolt hole to be depressed beyond their normal line of direction, said effect disappearing toward the center of the nut.

In testimony whereof, I have hereunto signed my name in the presence of two subscribing witnesses.

WILLIAM E. SHARP.

Witnesses:
JOHN W. HILL,
CHARLES I. COBB.